US011921439B2

(12) United States Patent
Oura et al.

(10) Patent No.: US 11,921,439 B2
(45) Date of Patent: Mar. 5, 2024

(54) DEVELOPING ROLL

(71) Applicant: NOK CORPORATION, Tokyo (JP)

(72) Inventors: Kosuke Oura, Kanagawa (JP); Atsushi Ikeda, Kanagawa (JP); Kenji Sasaki, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 18/010,276

(22) PCT Filed: Apr. 2, 2021

(86) PCT No.: PCT/JP2021/014307
§ 371 (c)(1),
(2) Date: Dec. 14, 2022

(87) PCT Pub. No.: WO2022/004085
PCT Pub. Date: Jan. 6, 2022

(65) Prior Publication Data

US 2023/0244154 A1 Aug. 3, 2023

(30) Foreign Application Priority Data

Jul. 1, 2020 (JP) ................................ 2020-114031

(51) Int. Cl.
*G03G 15/08* (2006.01)

(52) U.S. Cl.
CPC ................................ *G03G 15/0818* (2013.01)

(58) Field of Classification Search
CPC .................................................. G03G 15/0818
See application file for complete search history.

(56) References Cited

U.S. PATENT DOCUMENTS

2010/0046989 A1* 2/2010 Anan ................ G03G 15/0818 399/286
2019/0310563 A1* 10/2019 Fukaya ............. G03G 5/08221

FOREIGN PATENT DOCUMENTS

| | | |
|---|---|---|
| EP | 3 564 757 | 11/2017 |
| JP | 11-344856 | 12/1999 |
| JP | 2002-372855 | 12/2002 |

OTHER PUBLICATIONS

International Search Report issued in International Bureau of WIPO Patent Application No. PCT/JP2021/014307, dated Jun. 1, 2021.
Extended European Search Report received in European Patent Application No. 21833772.3, dated Oct. 10, 2023.

* cited by examiner

*Primary Examiner* — Sophia S Chen
(74) *Attorney, Agent, or Firm* — Greenblum & Bernstein, P.L.C.

(57) ABSTRACT

A developing roll used in an electrophotographic image forming apparatus has a metal core member, an elastic layer made of a rubber disposed around the core member, and a surface layer disposed around the elastic layer. The texture aspect ratio of the surface Str of the surface layer is equal to or greater than 0.55.

5 Claims, 3 Drawing Sheets

FIG. 5

| | Rz (μm) OF ELASTIC LAYER IN CIRCUMFERENTIAL DIRECTION | THICKNESS OF SURFACE LAYER (μm) | Str OF SURFACE LAYER | Rz (μm) OF SURFACE LAYER IN AXIAL DIRECTION | RSm (μm) OF SURFACE LAYER IN AXIAL DIRECTION | Rz (μm) OF SURFACE LAYER IN CIRCUMFERENTIAL DIRECTION | RSm (μm) OF SURFACE LAYER IN CIRCUMFERENTIAL DIRECTION | QUALITY OF IMAGE |
|---|---|---|---|---|---|---|---|---|
| SAMPLE 1 | 3 | 10 | 0.55 | 3.2 | 304 | 2.8 | 198 | GOOD |
| SAMPLE 2 | 3 | 10 | 0.70 | 9.6 | 131 | 8.8 | 89 | GOOD |
| SAMPLE 3 | 3 | 10 | 0.80 | 10.6 | 120 | 9.7 | 135 | GOOD |
| SAMPLE 4 | 3 | 10 | 0.89 | 6.5 | 103 | 7.1 | 97 | GOOD |
| SAMPLE 5 | 3 | 10 | 0.94 | 11.9 | 108 | 12.0 | 99 | GOOD |
| SAMPLE 6 | 3 | 15 | 0.73 | 7.8 | 104 | 7.1 | 78 | GOOD |
| SAMPLE 7 | 3 | 15 | 0.88 | 7.2 | 96 | 7.0 | 83 | GOOD |
| SAMPLE 8 | 3 | 20 | 0.77 | 9.5 | 96 | 8.6 | 85 | EXCELLENT |
| SAMPLE 9 | 3 | 20 | 0.89 | 7.6 | 88 | 7.5 | 78 | EXCELLENT |
| SAMPLE 10 | 3 | 20 | 0.93 | 10.3 | 100 | 9.7 | 103 | EXCELLENT |
| SAMPLE 11 | 3 | 25 | 0.97 | 8.8 | 100 | 8.1 | 74 | EXCELLENT |
| SAMPLE 12 | 6 | 20 | 0.83 | 10.4 | 117 | 9.5 | 89 | EXCELLENT |
| SAMPLE 13 | 6 | 40 | 0.83 | 10.1 | 118 | 9.5 | 100 | EXCELLENT |
| SAMPLE 14 | 6 | 10 | 0.08 | 11.0 | 150 | 14.6 | 121 | POOR |
| SAMPLE 15 | 6 | 10 | 0.10 | 6.7 | 161 | 6.4 | 126 | POOR |
| SAMPLE 16 | 6 | 10 | 0.20 | 11.9 | 177 | 13.1 | 108 | POOR |
| SAMPLE 17 | 6 | 10 | 0.30 | 4.8 | 332 | 4.3 | 197 | POOR |
| SAMPLE 18 | 6 | 10 | 0.36 | 8.9 | 120 | 9.0 | 101 | POOR |
| SAMPLE 19 | 6 | 10 | 0.40 | 9.5 | 198 | 9.1 | 126 | POOR |
| SAMPLE 20 | 6 | 10 | 0.44 | 3.7 | 206 | 4.0 | 182 | POOR |
| SAMPLE 21 | 6 | 10 | 0.48 | 4.4 | 242 | 4.2 | 179 | POOR |
| SAMPLE 22 | 6 | 10 | 0.53 | 12.3 | 110 | 13.2 | 109 | POOR |
| SAMPLE 23 | 6 | 15 | 0.22 | 8.2 | 198 | 8.5 | 143 | POOR |
| SAMPLE 24 | 6 | 15 | 0.30 | 6.5 | 159 | 6.6 | 138 | POOR |
| SAMPLE 25 | 6 | 15 | 0.34 | 7.4 | 144 | 8.0 | 121 | POOR |

DEVELOPING ROLL

TECHNICAL FIELD

The present invention relates to developing rolls used in electrophotographic image forming apparatuses.

BACKGROUND ART

In an electrophotographic image forming apparatus, a developing device is provided to supply a developing agent, i.e., toner, to a photoconductor drum. The developing device has a toner container and a developing roll. Toner that adheres to the outer peripheral surface of the developing roll is supplied to the photoconductor drum as the developing roll rotates. An electrostatic latent image is formed on the photoconductor drum, and toner particles are transferred from the developing roll to the electrostatic latent image to produce a toner developed image (Patent Document 1).

BACKGROUND DOCUMENT(S)

Patent Document(s)

Patent Document 1: JP-A-2002-372855

SUMMARY OF THE INVENTION

Quality of images printed by image forming apparatuses depends on the state of toner transport conducted by the developing roll. It is desirable that printed images have less unevenness.

Accordingly, the present invention provides a developing roll that reduces image unevenness.

In accordance with an aspect of the present invention, there is provided a developing roll used in an electrophotographic image forming apparatus. The developing roll includes a core member made of a metal, an elastic layer made of a rubber disposed around the core member, and a surface layer disposed around the elastic layer. In the developing roll, the texture aspect ratio of the surface Str of the surface layer is equal to or greater than 0.55.

In this aspect, the surface roughness of the surface layer does not depend much on directions, and thus, this aspect can reduce minute image unevenness that occurs periodically in images due to minute variation in surface roughness of the surface layer in the circumferential direction.

BRIEF DESCRIPTION OF THE DRAWINGS

FIG. 5 is a table showing measurement results of the indices of the surface layer of multiple samples of the developing roll and the results of image quality tests using the samples.

DESCRIPTION OF EMBODIMENT

Hereinafter, with reference to the accompanying drawings, an embodiment according to the present invention will be described. It is of note that the drawings are not necessarily to scale, and certain features may be exaggerated or omitted.

Figure 1:
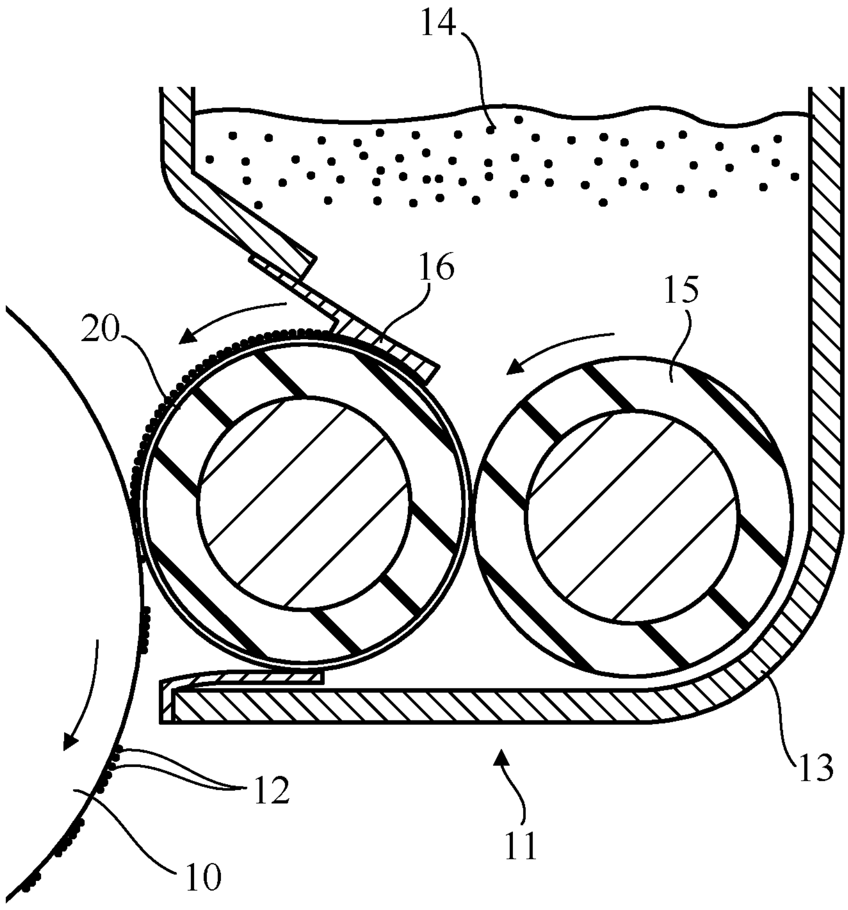
FIG. 1 shows a state of use of the developing roll in accordance with an embodiment of the present invention.

As shown in FIG. 1, an electrophotographic image forming apparatus has a photoconductor drum 10 and a developing unit 11. The photoconductor drum 10 rotates in the direction depicted by the arrow. The developer device 11 supplies toner particles 12, which are a developing agent, to the photoconductor drum 10. An electrostatic latent image is formed on the surface of the photoconductor drum 10 by a latent image forming device (not shown), and the toner particles 12 are transferred to the electrostatic latent image from the developing device 11, so that toner developed image with the toner particles 12 is generated on the outer peripheral surface of the photoconductor drum 10.

The developing device 11 has a toner container 13 that stores a mass 14 of toner particles, an elastic roll 15 disposed entirely within the toner container 13, a developing roll 20 disposed partially within the toner containers 13, and a doctor blade 16 (regulation blade) supported by the toner containers 13. The elastic roll 15 is pressed against the developing roll 20, and the developing roll 20 is pressed against the photoconductor drum 10. The elastic roll 15 and the developing roll 20 are rotated in directions indicated by the arrows, respectively, so that an almost constant amount of toner particles in the toner container 13 adhere to the developing roll 20. Thus, a thin layer of the toner particles is formed on the outer peripheral surface of the developing roll 20. As the developing roll 20 rotates, the toner particles that adhere to the developing roll 20 are transported toward the photoconductor drum 10. The doctor blade 16 positioned at the outlet for the toner particles in the toner container 13 is pressed against the outer peripheral surface of the developing roll 20 to regulate the amount of toner particles that adhere to the roll 20 and are conveyed from the toner container 13. Thus, the developing roll 20 is brought into contact with each of the photoconductor drum 10, the elastic roll 15, and the doctor blade 16 with a certain degree of force.

Although not shown, the developing device 11 may be provided with a member that agitates the mass 14 of toner particles in the toner container 13, a screw for conveying the toner particles in the toner container 13, etc.

Figure 2:
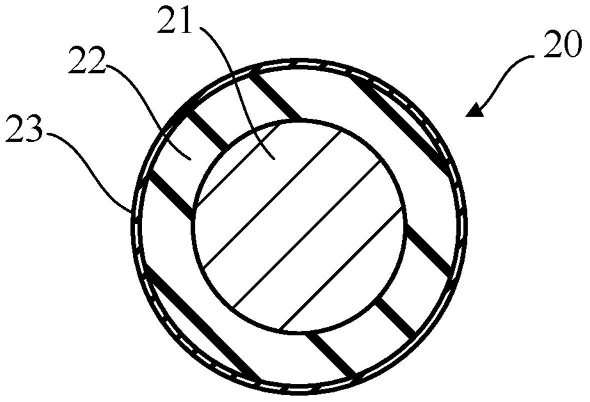
FIG. 2 is a cross-sectional view of the developing roll according to the embodiment.

As shown in FIG. 2, the developing roll 20 includes a cylindrical core member 21 made of a metal, an elastic layer 22 that is made of a rubber, is disposed around the core member 21, and has a uniform thickness, and a surface layer 23 that is made of a rubber, is disposed around the elastic layer 22, and has a uniform thickness. The diameter of the core member 21 is several millimeters, the thickness of the elastic layer 22 is 1 to 3 mm, and the thickness of the surface layer 23 is several micrometers to several tens of micrometers.

Both the elastic layer 22 and the surface layer 23 are made of rubber. In the embodiment, both the elastic layer 22 and the surface layer 23 are made of silicone rubber. However, the elastic layer 22 is provided to ensure the elasticity of the developing roll 20, and the surface layer 23 is provided to improve the abrasion resistance of the surface of the developing roll 20. Therefore, components of the material of the surface layer 23 are different from components of the material of the elastic layer 22.

The applicant produced multiple samples of the developing roll 20 as follows:

First, an iron shaft having an outer diameter of 10 mm was prepared as the core member 21.

The peripheral surface of the core member 21 was coated with an electroconductive silicone rubber, whereby the elastic layer 22 was formed. The volume resistivity of the electroconductive silicone rubber was $10^{-6}$ ohm-centimeter, and the rubber hardness of the electroconductive silicone rubber measured by use of a durometer "Type A" according to JIS K 6253 and ISO 7619 was 40.

Figure 3:
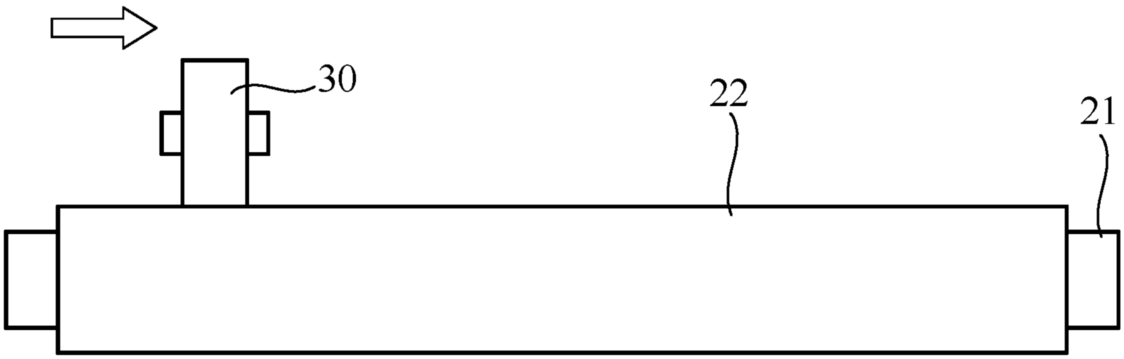
FIG. 3 is a schematic diagram showing a step in a manufacturing process of the developing roll according to the embodiment.

Next, as shown in FIG. 3, the elastic layer 22 was polished with a grinding wheel 30 of a cylindrical polishing machine until the outer diameter of the elastic layer 22 reached 16 mm. Thus, the thickness of the elastic layer 22 was 3 mm. The main purpose of polishing was to make the outer diameter of the developing roll 20 uniform in the axial direction thereof and to improve the roundness of the developing roll 20, so as to make the contact width of the developing roll 20 and the photoconductor drum 10 and the contact width of the developing roll 20 and the doctor blade 16 uniform in the axial direction of the developing roll 20.

On the other hand, a coating liquid that is the material for the surface layer 23 was prepared. First, a reactive silicone oil, an isocyanate compound, its isocyanurate modified form, and a diluting solvent capable of dissolving these components were mixed in a reaction vessel. Then, the mixture was left to promote prepolymerization reaction of the components.

Next, the solution obtained in the prepolymerization reaction (with solid contents of 50 percent) was mixed with an isocyanate compound as a binder, its isocyanurate modified form, and silicone rubber particles to make the coating liquid (with solid contents of 34 percent), which is the material for the surface layer 23.

The coating liquid was then stirred at high speed in a bead mill to disperse the solid components in the liquid. The coating liquid was further stirred with use of a stirrer for one hour.

On the other hand, a primer was sprayed to coat the peripheral surface of the elastic layer 22. The primer was "KBP-40" manufactured by Shin-Etsu Chemical Co. (Tokyo, Japan).

Next, the coating liquid was sprayed to coat the peripheral surface of the elastic layer 22 and heated at 160 degrees Celsius for 40 minutes, thereby drying the coating liquid, so that the surface layer 23 was formed.

Figure 4:
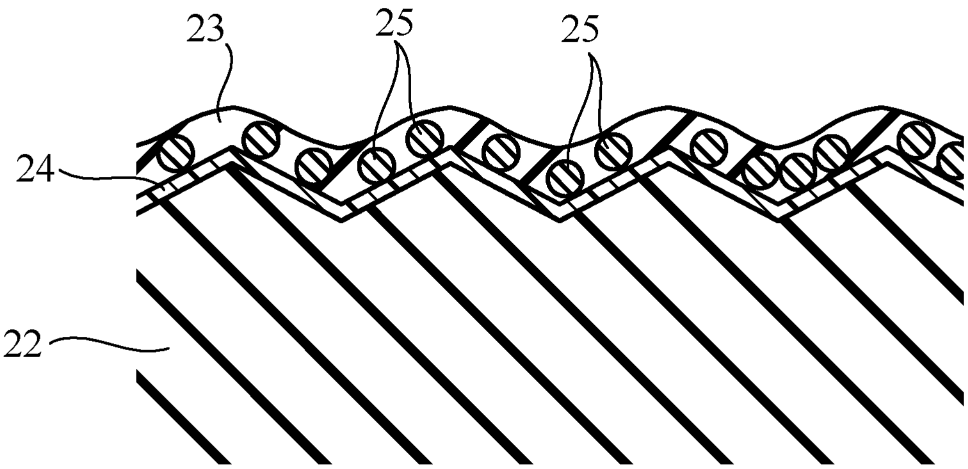
FIG. 4 is an enlarged cross-sectional view of the developing roll according to the embodiment.

FIG. 4 is an enlarged cross-sectional view of the developing roll 20. The surface layer 23 is adhered to the elastic layer 22 via a primer layer 24, which is an adhesive layer. Inside the surface layer 23, silicone rubber particles 25 are dispersed.

The applicant produced multiple samples with different properties in the surface layer 23 as shown in FIG. 5 by adjusting the surface roughness of the elastic layer 22 (ten point height of irregularities $R_z$ according to JIS B 0601 (1994)), the thickness of the surface layer 23, and material composition of the surface layer 23. The ten point height of irregularities $R_z$ in the circumferential direction of the elastic layer shown in FIG. 5 is the value measured along the circumferential direction of the elastic layer 22 after the above-mentioned polishing, and reflects the irregularities of the polishing.

As is clear from FIG. 4, if the roughness of the elastic layer 22 is large, the roughness of the outer surface layer 23 is also large. However, if the thickness of the surface layer 23 is large, the influence of the roughness of the elastic layer 22 on the roughness of the surface layer 23 is reduced.

The applicant measured the ten point height of irregularities $R_z$ of the elastic layer 22 in the circumferential direction, the texture aspect ratio of the surface Str of the surface layer 23, the ten point height of irregularities $R_z$ of the surface layer 23 in the axial direction, the mean width of the profile elements (mean length of a roughness curve element) RSm of the surface layer 23 in the axial direction, $R_z$ of the surface layer 23 in the circumferential direction, and RSm of the surface layer 23 in the circumferential direction for multiple samples of the developing roll 20. The measurement results are shown in FIG. 5.

The values of ten point height of irregularities Rz of the elastic layer 22 and the surface layer 23 were measured using a contact-type surface roughness measuring machine. The measuring machine was a Surf Coder "SE500" manufactured by Kosaka Laboratory Ltd. (Tokyo Japan). The radius of the probe of "SE500" was 2 μm, the angle of the tip of the probe was 60 degrees, and the contact force was 0.75 mN. The cutoff value λc in the measurement was 0.8 mm, the roughness measurement length (reference length) was 4 mm, and the feed rate of the probe was 0.5 mm/sec. The measurement position was the center of the sample in the longitudinal direction.

For the measurement of Str and RSm, the surface of the surface layer 23 in the longitudinal center of each sample was photographed with a non-contact type laser microscope. The laser microscope used was "VK-X250" manufactured by Keyence Corporation (Tokyo, Japan). Magnification was 400 times, and the magnification of the objective lens used was 20 times.

Next, using Version 1 3.0.116 of the multi-file analysis application "VK-H1XM" produced by Keyence Corporation, the second-order curved surface correction was performed for the geometric data obtained by photographing. Second-order curved surface correction is a process of removing data components corresponding to the cylindrical surface of from the geometrical data obtained by photographing. In other words, it is a process of converting the geometric data on the cylindrical surface obtained by photographing into geometric data on a virtual plane.

Furthermore, using the same application, the texture aspect ratio of the surface Str was calculated in the photographed field of view on the basis of the data obtained by the second-order curved surface correction.

The same application was also used to calculate RSm values in the axial and circumferential directions in the photographed field of view. The cutoff value λs was set to "none" and the cutoff value λc was set to "none".

The texture aspect ratio of the surface Str is defined in ISO 25178 and has a range from 0 to 1. An Str value close to 0 means that the surface roughness has a directionality (is spatially anisotropic, e.g., the surface has multiple grooves extending parallel). An Str value close to 1 means that the surface roughness does not depend on directions (is spatially isotropic).

On the other hand, the ten point height of irregularities Rz represents the height of the surface unevenness, and the mean width of the profile elements RSm represents the pitch of the surface unevenness.

The applicant actually mounted the samples on a printer and tested quality of the printed images by printing images on sheets of paper. The printer was a "HL-L8360CDW" (trade name) manufactured by Brother Industries, Ltd. (Aichi, Japan), and printed a halftone image of uniform density over the entire surface of each sheet of paper.

Image quality was evaluated by human eyes according to the criteria given below. If periodic minute image unevenness in density was large, the image quality was judged to be poor. If the periodic minute unevenness in density was small, the image quality was judged to be good. If the periodic minute unevenness in density was very small, the image quality was judged to be excellent.

It is considered that the periodic minute unevenness in density is caused by minute roughness variation in surface roughness of the surface layer 23 in the circumferential direction. It is considered that in a case in which the roughness variation of the surface layer 23, i.e., the developing roll 20, in the circumferential direction is large, the amount of toner particles supplied from the developing roll 20 to the photoconductor drum 10 is non-uniform in the circumferential direction of the photoconductor drum 10, so that periodic unevenness in density appears on the sheets of paper.

FIG. 5 shows the evaluation results of image quality.

According to the results in FIG. 5, the image quality is good when the aspect ratio Str is equal to or greater than 0.55. In addition, the closer the aspect ratio Str is to 1, the better the image quality is. In other words, it is preferable that directionality of the surface roughness of the surface layer 23 be less. In general, to reduce the directionality of the roughness of the surface of the surface layer 23, the directionality of the roughness of the surface of the elastic layer 22 below the surface layer 23 should be small and the surface layer 23 should be thicker.

In particular, the applicant focuses on samples 8-13, which had excellent image quality. It is preferable that the thickness of the surface layer 23 be equal to or more than 20 μm and be equal to or less than 40 μm.

In addition, according to samples 8-13, it is preferable that the aspect ratio Str is equal to or greater than 0.77, as well as the ten point height of irregularities $R_z$ in the axial direction of the surface layer 23 be equal to or greater than 7.6 μm and is equal to or less than 10.4 μm, and the ten point height of irregularities $R_z$ in the circumferential direction of the surface layer 23 be from 7.5 μm to 9.7 μm. It is also preferable that the mean width of the profile elements RSm in the axial direction of the surface layer 23 be from 88 μm to 118 μm, and the mean width of the profile elements RSm in the circumferential direction of the surface layer 23 be from 74 μm to 103 μm.

The present invention has been shown and described with reference to preferred embodiments thereof However, it will be understood by those skilled in the art that various changes in form and detail may be made without departing from the scope of the invention as defined by the claims. Such variations, alterations, and modifications are intended to be encompassed in the scope of the present invention.

REFERENCE SYMBOLS

20: Developing roll
21: Core member
22: Elastic layer
23: Surface layer
24: Primer layer
25: Silicone rubber particles

The invention claimed is:

1. A developing roll used in an electrophotographic image forming apparatus, the developing roll comprising:
a core member made of a metal;
an elastic layer made of a rubber disposed around the core member; and
a surface layer disposed around the elastic layer,
the surface layer having a texture aspect ratio of a surface (Str) that is equal to or greater than 0.55.

2. The developing roll according to claim 1, wherein the surface layer having a thickness that is equal to or greater than 20 μm and is equal to or less than 40 μm.

3. The developing roll according to claim 2, wherein the elastic layer has a ten point height of irregularities (Rz) that is equal to or greater than 3 μm and is equal to or less than 6 μm in a circumferential direction.

4. The developing roll according to claim 1, wherein the texture aspect ratio of the surface (Str) of the surface layer is equal to or greater than 0.77,
wherein the surface layer has a ten point height of irregularities (Rz) in an axial direction that is equal to or greater than 7.6 μm and is equal to or less than 10.4 μm, and
wherein the surface layer has a ten point height of irregularities (Rz) in a circumferential direction that is equal to or greater than 7.5 μm and is equal to or less than 9.7 μm.

5. The developing roll according to claim 4, wherein the surface layer has a mean width of profile elements (RSm) in the axial direction that is equal to or greater than 88 μm and is equal to or less than 118 μm, and
wherein the surface layer has a mean width of profile elements (RSm) in the circumferential direction that is equal to or greater than 74 μm and is equal to or less than 103 μm.

* * * * *